United States Patent [19]

Surles et al.

[11] Patent Number: 5,199,490
[45] Date of Patent: Apr. 6, 1993

[54] FORMATION TREATING

[75] Inventors: Billy W. Surles, Houston; Philip D. Fader, Katy; Carlos W. Pardo, Missouri City, all of Tex.

[73] Assignee: Texaco Inc., White Plains, N.Y.

[21] Appl. No.: 793,928

[22] Filed: Nov. 18, 1991

[51] Int. Cl.⁵ .................... E21B 33/138; E21B 43/24
[52] U.S. Cl. .................... 166/270; 166/272; 166/288; 166/295
[58] Field of Search ............. 166/270, 272, 288, 294, 166/295, 300, 303

[56] References Cited

U.S. PATENT DOCUMENTS

| | | | |
|---|---|---|---|
| 2,796,934 | 6/1957 | Vogel | 166/295 |
| 3,645,336 | 2/1972 | Young | 166/288 |
| 4,015,995 | 4/1977 | Hess | 166/295 X |
| 4,091,868 | 5/1978 | Kozlowski et al. | 166/295 X |
| 4,250,963 | 2/1981 | Hess | 166/288 |
| 4,665,986 | 5/1987 | Sandiford | 166/288 |
| 4,842,072 | 6/1989 | Friedman et al. | 166/295 |
| 4,903,770 | 2/1990 | Friedman et al. | 166/295 x |
| 4,938,287 | 7/1990 | Friedman et al. | 166/295 X |
| 5,005,648 | 4/1991 | Friedman et al. | 166/295 |

*Primary Examiner*—George A. Suchfield
*Attorney, Agent, or Firm*—James L. Bailey; Jack H. Park

[57] ABSTRACT

Disclosed are processes for treating a subterranean formation to improve the permeability distribution by reducing the permeability in high permeability zones, so fluids injected for oil recovery purposes will sweep more uniformly through the formation. The processes involve injecting a polymerizable compound, preferably a monomer or oligomer of furfuryl alcohol, together with a diluent, preferably an ester such as butyl acetate, and a suitable acid catalyst for the formation conditions, generally toluenesulfonic acid. The fluid may be injected in a liquid phase or mixed with steam or non-condensable gas to form an aerosol, which is injected then into the formation prior to the injection of the oil recovery fluid, which may be water, surfactant fluid, polymer fluid, or steam.

25 Claims, No Drawings

FORMATION TREATING

REFERENCE TO COPENDING APPLICATION

This application is related to copending application Ser. No. 07/718,513 filed Jun. 21, 1991 for "Sand Consolidation Methods" and to copending application Ser. No. 07/762,150 filed Sep. 19, 1991 for "Sand Consolidation Methods."

FIELD OF THE INVENTION

This invention pertains to a method of treating formations. More particularly, this invention pertains to a method for treating formations which exhibit variations in permeability from one depth to another within the formation, which cause enhanced oil recovery fluids injected into the formation to enter the formations in an uneven fashion, with a substantial portion of the injected fluid entering a relatively small portion of the total formation due to the high permeability of one portion of the formation. The treatment reduces the permeability variation and causes more even invasion of the formation by enhanced oil recovery fluids. Still more particularly, this method involves injecting a polymerizable compound into a formation having poor permeability distribution, in order to reduce the permeability of the more permeable zones in the formation, so a subsequently injected oil recovery fluid will enter the formation uniformly.

BACKGROUND OF THE INVENTION

When a deposit of petroleum is located in a subterranean formation, one or more wells are drilled into the formation and the petroleum is allowed to flow or is pumped to the surface of the earth during a period of production commonly referred to as primary production. Unfortunately, primary production recovers only a small fraction of the petroleum originally present in the formation. It has become common practice to apply some form of treatment commonly referred to as enhanced oil recovery to the formation to stimulate the production of petroleum, in order to obtain a larger portion of the petroleum from the formation. The commonest form or treatment comprises injecting water into the formation, which displaces a portion of the petroleum through the permeable formation to a remotely located well by means of which it is recovered to the surface of the earth. Various chemicals including viscosity increasing polymers and surface tension reducing surfactants have been incorporated in the injection water, in order to increase the total amount of petroleum recovered from a formation. Injection of steam into subterranean formations containing viscous petroleum has been particularly successful, since primary production recovers very little and in some cases, none of the viscous petroleum originally present in the formation, and steam stimulation has resulted in significant production at relatively modest cost. Steam stimulation may involve injecting steam into one or more wells on a continuous basis and recovering oil from remotely located wells, or it may involve injecting steam into a well for a period of time followed by producing petroleum from the same well.

When a well is drilled into a subterranean petroleum formation, it is common practice to establish communication between the interior of the well and the formation over a substantial portion of the vertical thickness of the petroleum formation. When fluids are injected into the formation via these perforations, it is desirable that the recovery fluid enter the formation relatively evenly, e.g. half of the fluid enters the top half of the formation and half of the fluid enters the bottom half of the formation. Unfortunately, distributions in permeability in formations are so uneven that it is frequently observed that a substantial portion of the steam is entering only a very small portion of the total thickness of the petroleum formation. Oil field service companies offer well surveys which can measure and determine the injectivity profile of an interval, which indicates how evenly the fluid is entering the formation. If the injectivity profile is unfavorable, meaning a major portion of the recovery fluid is entering only a small portion of the thickness of the formation, then the effect of fluid injection on the well will be greatly reduced and some type of remedial treatment must be applied if a significant portion of the oil present in the formation is to be produced by the enhanced oil recovery process.

This problem has been long recognized by persons working in this particular area, and many prior art methods describe processes to be applied to wells for the purpose of altering the fluid injectivity profile of an interval penetrated by a well to a more favorable profile, e.g., to reduce the permeability of the more permeable intervals substantially without reducing the permeability of the less permeable intervals to a similar extent. A great many prior art references describe formation treating processes employing polymers such as carboxymethylcellulose which is injected into the formation, and cross-linking of the polymer within the formation is caused by the presence of trivalent ions such as chromium which, depending on the particular application, are injected previously or subsequently to the polymeric fluid. Many of these processes require successive injections of fluids in order to accomplish sufficient cross-linking of the polymers to accomplish significant reduction of permeability in the very high permeability zones, sometimes referred to as thief zones, in formations, in order to improve the injectivity profile of a subsequently applied oil recovery process involving injection of fluid into the formation for the purpose of stimulating oil production.

Other prior art methods involve injecting polymers into the formation which can be caused to thicken after they have entered the formation.

While many of these procedures have enjoyed success in certain situations, many formations have not responded favorably to prior art methods for a variety of reasons. Many treatment processes require injection of a plurality of different slugs into the formations to interact, and this greatly increases the time and cost of the treatment procedure. Many of the compounds utilized are quite expensive, and this also adds significantly to the cost of the permeability altering processes.

When the oil recovery method to be applied to a formation involves injection of steam, yet another weakness of prior art methods is encountered. Many of the polymers employed in prior art methods are not stable at the high temperatures encountered during the injection of steam into the formation, which may run from 220° to 700° F., and therefore these procedures cannot be employed when steam is to be injected into the formation.

In view of the foregoing brief discussion, it can be appreciated that there is an unfulfilled need for a relatively inexpensive process that can be applied to formation to reduce the wide variations in permeability of the formation. There is a particularly serious unfulfilled need for a process to be applied to a subterranean formation which will resist the temperatures of subsequently injected high temperature fluids such as steam.

PRIOR ART

Numerous prior art references utilize materials similar to that used in our process for a different purpose, that of controlling unconsolidated sand flow in producing wells. These references are detailed below.

In U.S. Pat. No. 4,427,069 there is disclosed a procedure for consolidating sand in a formation adjacent to a wellbore using an oligomer of furfuryl alcohol, in which the catalyst used is a water soluble acidic salt, preferably zirconyl chloride, which is injected in an aqueous solution into the formation prior to the resin containing fluid injection.

In U.S. Pat. No. 4,842,072 for "SAND CONSOLIDATION" we disclosed a particularly effective method for consolidating sand utilizing a mixture of a polymerizable resin such as an oligomer of furfuryl alcohol and a diluent such as butyl acetate and an oil soluble, slightly water soluble acid catalyst such as orthonitrobenzoic acid is injected followed by injection of salt water to reestablish permeability.

In U.S. Pat. No. 4,669,543 which issued Jun. 2, 1987, there is described a method for consolidating sand using an acid curable resin and utilizing as a catalyst, the reaction product of an acid, and an alkyl metal or ammonia molybdate. In that instance, the catalyst is incorporated in an aqueous carrier fluid which comprises the continuous phase of an emulsion in which the polymerizable resin is the dispersed or discontinuous phase.

U.S. Pat. No. 5,010,953 which issued Apr. 30, 1991 teaches a sand consolidating process using a polymerizable compound such as furfuryl alcohol, a diluent such as a low molecular weight alcohol, an acid catalyst and an ester and as an additive to reduce shrinkage, a copolymer of starch and a synthetic polymer such as acrylamide or acrylate.

U.S. Pat. No. 5,005,647 which issued Apr. 9, 1991, discloses a process for shutting off permeable zones in wellbores to reduce excess water flow using fluids similar to that described in U.S. Pat. No. 5,010,953 discussed above.

U.S. Pat. No. 5,005,648 which issued Apr. 5, 1991 describes a method of treating permeable zones in a formation to reduce water flow into a well completed therein by injecting a fluid-containing polymerizable compound, an ester, an alcohol diluent, an acid catalyst such as orthonitrobenzoic acid or toluenesulfonic acid.

U.S. Pat. No. 4,938,287 which issued Jul. 3, 1990 describes an oil recovery process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

U.S. Pat. No. 4,892,072 which issued Jun. 27, 1989 describes a sand consolidation process using a single treating fluid comprising a polymerizable compound such as furfuryl alcohol, a diluent such as butyl acetate, and an acid catalyst, preferably orthonitrobenzoic acid injected into a zone followed by injecting salt water.

U.S. Pat. No. 4,903,770 which issued Feb. 27, 1990, for "Sand Consolidation Methods" describes a method employing an aerosol spray made up with furfuryl alcohol, methanol, sulfuric acid and steam.

SUMMARY OF THE INVENTION

We have discovered that it is possible to treat a subterranean formation which exhibits a poor injectivity profile during secondary or tertiary recovery operations, in which the amount of steam entering different intervals of the formation is significantly uneven, in order to reduce the variation in permeability of the different zones of the formation. By this treatment, the injectivity of fluid into the formation can be made much more uniform and even, which results in the injected fluid affecting a greater portion of the petroleum-containing formation, and thereby increasing the amount of oil that can be recovered from the formation. Our process can be used in conjunction with steam injection, whereas the materials used in many prior art well treating processes are destroyed by contact with steam.

Our process involves injecting into the formation a fluid containing a polymerizable compound which can be polymerized by heat or acid to cross-link within the portion of the formation into which the compound is injected, reducing the permeability of the very high permeability zones of the formation. The preferred polymerizable compounds are a monomer or oligomer of furfuryl alcohol. The furfuryl alcohol derivative can be introduced as a substantially all liquid phase treating fluid, but in a particularly preferred embodiment, a two-phase aerosol treating fluid comprising the polymerizable furfuryl alcohol monomer and steam or compressed gas is formed and injected into the formation. When the aerosol is formed, a mixture comprising the furfuryl alcohol monomer, ethyl acetate as a diluent and as a reaction modifier, methylalcohol as a solvent and an acid to catalyzed the polymerization which may be an alkyl benzene sulfonic acid such as toluene sulfonic acid or a mineral acid such as sulfuric acid. The treatment procedures should be applied before significant portion of the steam is injected into the formation, and the application of this process greatly enhances the injectivity profile of the subsequently injected steam.

DETAILED DESCRIPTION OF THE INVENTION INCLUDING THE PREFERRED EMBODIMENTS

Our invention is concerned with a method of treating subterranean formations in order to alter the permeability distribution of those formations, which achieves a more uniform distribution of permeability within the formation. This treatment allows a subsequently injected fluid for the purpose of stimulating oil recovery to pass more evenly throughout the full vertical thickness of the formation, which results in a greater recovery effectiveness of the oil recovery process. Throughout this application, we will frequently refer to the injection of steam, and indeed a preferred embodiment of our process involves a procedure for treating a formation prior to steam injection or in some instances in early stages of steam injection, and the process is unique in that it can be used with steam stimulation without having the steam destroy the permeability altering chemicals as is sometimes encountered with prior art methods. It should be understood, however, that this procedure may also be used with any oil recovery process in which a fluid is injected into the formation to displace petroleum to the same or a remotely located production well. Specifically, the process of our invention may be applied to a formation after which water injection is applied, and the effect of treating with our process insures that water displaces oil from a greater portion of the vertical thickness of the formation than would be possible without the application of our process prior to water injection. Application of this process in conjunction with surfactant flooding and polymer flooding, or combinations thereof, are also within the description contained herein.

I. THE STEAM AEROSOL EMBODIMENT

The especially preferred embodiment of our invention involves application of a two phase aerosol fluid in which the polymerizable furfuryl alcohol monomer is the dispersed liquid phase with steam constituting the vapor phase of the aerosol mixture. The particularly unique and beneficial effect of this embodiment resides in the effectiveness in reducing the permeability of high permeability zones to a level more nearly equal to the permeability of the adjacent zones without plugging these originally high permeability zones as many prior art processes do. Also, the quantity of chemical used in treating a formation using the steam aerosol embodiment of our process is much less than the quantity required in prior art processes employing a liquid phase treating fluid.

The polymerizable monomer which we have found to be especially preferable for use in the aerosol embodiment of our sand consolidation reaction is furfural alcohol. Any monomer which will polymerize upon exposure to heat and contact with an acid catalyst can be used in this process; however, furfuryl alcohol ($C_4H_3OCH_2O$) is the particularly preferred polymerizable monomer. This material has the advantage of being relatively inexpensive and having the characteristic of autopolymerizing on exposure to acid catalyst, forming a thermal setting resin which cures to an insoluble mass that is highly resistant to chemical attack as well as to thermal degradation.

During the injecting step the mixture of steam, monomer, diluent and catalyst enters the formation as an aerosol with steam vapor comprising the gaseous phase and dispersed drops of monomer and acid comprising the dispersed phase. The multiphase mixture is at or near steam temperature, which is ordinarily greater than the formation temperature. Drops of monomer and acid condense on the sand grains, which join together to form a liquid coating on the sand grains which reduces the void space around the sand grains, thereby reducing the permeability of the zone. Polymerization occurs quickly in this liquid film, the reaction rate being roughly first order with monomer concentration and pH. At 150° C. polymerization occurs in a matter of seconds, while the mixture of monomer and acid are stable and unreactive at surface conditions of 30° C. for several days.

The furfuryl alcohol utilized in our process is so reactive to acid that it must be diluted with an appropriate solvent in order to permit it to be dispersed in the steam and injected into the formation without premature reaction. Presence of a diluent accomplishes relatively complete coating of the sand grains in the high permeability zones of the formation. Any inexpensive solvent for the furfuryl alcohol monomer would accomplish this objective. Accordingly, our preferred diluent for the furfuryl alcohol monomer is a low carbon alcohol, and our especially preferred solvent is methanol.

Many preferred embodiments of our invention employ a fluid to react with and remove water which is produced in the condensation reaction. An acetate such as ethyl or butyl or other rapidly reacting anhydride is our preferred material for this purpose. Our preferred ester is ethyl acetate.

It is necessary for this procedure that the acid catalyst utilized be non-volatile so that it remains in the liquid phase of the multiphase treating fluid. This permits thorough mixing of the catalyst with the polymerizable monomer which is essential in or order to ensure that the polymerization reaction occurs uniformly throughout the entire mass of formation contacted by the polymerizable monomer. It is not necessary in our invention that once the fluid is placed in the formation, it be left in a quiescent state for a long period of time sufficient to ensure complete reaction, as is required in many prior art methods. The polymerization reaction occurs very rapidly and is completed in a relatively brief period of time, so oil recovery fluid injection may begin immediately.

Our methods are preferably accomplished using the following materials and procedures. The steam aerosol embodiment of our invention is especially successful when applied to formations containing heavy oil which ordinarily requires steam stimulation to achieve commercial oil recovery rates. Such formations are typically relatively shallow, e.g. seldom deeper than 2,000 feet. If it is desired to apply the methods of our invention to deeper formations, some modifications to the injection procedures may be required to avoid polymerization in the injection line.

It is necessary that a source of steam be available at or near the well. The quality of steam is not critical to our process, and from 50 to 100 percent steam may be used. The quality of steam must be known, however, since the ester must be incorporated in the consolidating fluid whenever the steam quality is below about 80 percent. When used, the concentration of ester in the polymer fluid is from 5 to 30 and preferably 20 to 30 percent by volume.

In applying this preferred embodiment, a treating fluid is provided on the surface near the well. This fluid is liquid phase and comprises from 10 to 50 and preferably from 20 to 30 percent by volume of a polymerizable monomer, usually furfuryl alcohol. Furfuryl is our preferred polymerizable monomer because it is inexpensive, readily available, non-toxic, easily auto polymerized by acid, and forms a strong, durable polymer which withstands hostile conditions in the formation well including those associated with steam stimulation.

A diluent is used with furfuryl alcohol to reduce the reaction rate on contact with acid. Directly mixing furfuryl alcohol with acid can produce high reaction rates or even an explosion. Any polar organic diluent may be used, but low molecular weight alcohol is the preferred diluent and methanol is our especially preferred material. Non-polar solvents must not be used since uncontrolled reaction rates including explosions result. The treating fluid should contain from 90 to 50 and preferably from 80 to 70 percent by volume polar organic diluent. If an ester is used in the fluid because of low steam quality, the volume of solvent is reduced accordingly so the total solvent amounts are as described above.

The acid used to catalyze the polymerization of the monomer should be non-volatile strong acid. Sulfuric acid and trichloroacetic acid are the preferred acids.

The concentration of acid in the treating fluid is very critical, since the acid concentration determines the reaction rate of the polymerization. Since the reactable monomer and acid are mixed with steam on the surface, the temperature of the fluid will be known, but not easily adjustable; therefore, the acid content of the treating fluid and the concentration of monomer are the primary means for controlling the polymerization rate. It is desired that essentially little or no reaction occur in the injection string before the fluid enters the formation. Since the depth and temperature of the formation are well known and the fluid injection rate is controllable or known, it is possible to adjust the acid content of the treating fluid so polymerization occurs precisely when desired, which is shortly after the fluid enters the formation.

The following is a guideline for adjusting acid content of the treating fluid for various formation temperatures in order to cause the polymerization to occur in the desired time.

TABLE 1

Preferred Treating Fluid Acid Content For Various Temperatures

| Temperature (°F.) | Acid Content (Normality) | Time |
|---|---|---|
| 73 | 1 | 1.5 hr. |
|  | .2 | 9 hr. |
|  | .1 | 17 hr. |
|  | .05 | 32 hr. |
| 194 | 1 | 45 sec. |
|  | .2 | 4 min. |
|  | .1 | 8 min. |
|  | .05 | 14 min. |
| 300 | 1 | 6 sec. |
|  | .2 | 30 sec. |
|  | .1 | 60 sec. |
|  | .05 | 2 min. |

Ordinarily, this fluid is injected relatively fast when using a 1 to 3 inch diameter line in the wellbore carrying treating fluid and steam where the steam generator delivers steam having quality values of from 50 to 80 percent at a pressure of from 250 to 350 pounds per square inch. Under these conditions the transit time in the injection string will be from 10 to 60 seconds.

In applying our methods, the consolidating fluid described above is mixed with steam on the surface, with the mixture passing through an injection string and into the formation where permeability reduction is desired. The fluid is mixed with steam in a volume ratio in the range of one part treating fluid to from 0.2 to 1 and preferably 0.4 to 0.6 parts by volume steam.

The mixture of polymerizable resin-containing fluid and steam forms a two-phase treating fluid, ideally an aerosol, and enters the formation in that form. The treating fluid droplets coalesce on the sand grains, forming a liquid coating on the said particles or other mineral surfaces. Since the dispersed drops of liquid in the aerosol treating fluid include the polymerizable monomer and the acid, the liquid film formed on the formation surface comprises both monomer and acid. As the film forms, the polymerization of monomer begins due to presence of acid in the fluid and proceeds very rapidly. The vapor portion of steam maintains the void spaces between monomer-coated formation surfaces open, which insures that the treated formation will have sufficient permeability to allow passage of enhanced oil recovery fluid or oil later, after the coating has cured and steam injection has resumed.

The quantity of the treating fluid comprising the polymerizable monomer, diluent and catalyst injected into the formation varies depending on the thickness and porosity of the formation to which our process is to be applied, as well as the diameter of the well and the desired thickness of the treated zone in the formation. The thickness and porosity of the formation and the diameter of the well will always be known, and it is ordinarily satisfactory if depth of the penetration of the treatment is in the range of from 6 to 12 inches from the well bore.

Since this process does not require completely filling the void space of the portion of the formation being treated with treating fluid, the required volume of consolidating fluid is from 10 to 30 percent of the pore space of portion of the formation being treated. As an example, if it is desired to treat a formation whose thickness is 18 feet and average porosity is 35% to reduce the permeability of the high permeability zones in the formation from just outside the perforations of the wellbore to a distance of 1.0 foot from the wellbore and the well being treated is 10 inches in diameter, then the volume of fluid necessary is calculated according to the example below.

$$\text{Radius of hole} = \frac{10}{2} \div \frac{1}{12} = .417$$

$$\text{Vol.} = \pi[(1.417)^2 - (.417)^2] \times 18 \times .35 \times .20$$
$$= 7.26 \text{ cubic feet}$$
$$= 54.3 \text{ gallons of the treating fluid comprising}$$

monomer, diluent and acid. Since the consolidating fluid is mixed with steam in the ratio of 4 to 1, the total volume of aerosol treating fluid is 271.5 gallons.

After the steam and treating fluid are injected, the well should be shut in and left to stand for a period of from 1 to 24 and preferably from 2 to 9 hours to permit completion of the polymerization. Steam injection may then be resumed.

II. NONCONDENSABLE GAS AEROSOL FLUID EMBODIMENT

Another preferred embodiment for our process employs injecting an aerosol containing the furfuryl alcohol derivative in an aerosol form, similar to that described above; however, in this second embodiment, an oligomer of furfuryl alcohol is used, and a non-condensable gas such as compressed air or nitrogen is utilized as the gas phase of the multiphase injection fluid.

The polymerizable oligomer which we have found to be especially preferable for use in our formation treating reaction is an oligomer of furfuryl alcohol. Any oligomer which will polymerize at formation temperature with an acid catalyst can be used in this process; however, a fluid comprising an oligomer of furfuryl alcohol $(C_4H_3OCH_2O)_n$ is the particularly preferred polymerizable oligomer. This material has the advantage of being relatively inexpensive and having the characteristic of autopolymerizing on exposure to acid catalyst, forming a thermal setting resin which cures to an insoluble mass that is highly resistant to chemical attack as well as to thermal degradation. A preferred commercial product for this application is QO Chemicals QUACOOR 1300 ® Furan Resin. Although we found and reported above that a monomer of furfuryl alcohol is a preferred material when a similar process is applied using steam to form the aerosol mixture, we have found that the monomer is not suitable in the present embodiment where the aerosol is formulated by spraying the acid catalyzable compound with the non-condensable gas at essentially surface ambient temperatures. The steam aerosol system required 300° F. or greater temperatures to begin the polymerization of the furfuryl alcohol monomer before it hits the sand face, as the less viscous monomer will not adhere to the sand grains in the formations, and so a satisfactory treatment will not be achieved. Attempts were made to compensate for this by increasing the amount of catalyst used in the fluid containing furfuryl alcohol monomer and acid catalyst in the preparation of the steam monomer aerosol, but it was found that the furfuryl alcohol monomer was too reactive to control at mixing and injection conditions.

The gas utilized in formulating the aerosol mixture can be any available gas which is non-condensable at injection and formation conditions. Compressed air is the most likely candidate because it is inexpensive and widely available. Nitrogen is also a preferred gas for this purpose. Although other gases might be used, air and nitrogen are the gases of choice because of availability and economy.

It is necessary that a source of non-condensable gas be available at or near the well. Usually the most convenient way of forming the aerosol treating fluid used in the process of our invention is with the use of a conventional air compressor, and spraying the liquid oligomer containing material through an injection nipple to accomplish an even dispersal of the liquid resin in the gas stream. By proper choice of the injection nozzle diameter, liquid pressure and the air pressure, it is possible to form a fairly fine spray containing relatively even size of droplets of polymerizable fluid and good droplet distribution in compressed air. As a general rule, satisfactory results are achieved if the liquid is injected through a ¼ to ⅜ inch nozzle when the liquid injection pressure is from 100 to 300 pounds per square inch, when injected into a gas steam whose flow rate is from 2.2 to 3.3 SCF per hour.

We have found that the preferred aerosol can be formulated if a mixture of the furfuryl alcohol oligomer, e.g. the QUACOOR 1300 ® Furan Resin is mixed with an ester. Although the ratio of the polymerizable resin to ester may vary depending on the surface ambient temperature and the available gas pressure, we have found that the preferred results are obtained by using from 20 to 70 and preferably from 40 to 60 percent of the acid catalyzable furfuryl alcohol oligomer mixed with an ester, preferably butyl acetate. The predetermined concentration and choice of acid catalyst is mixed with the resin ester mixture before the aerosol mixture is formulated, as described below.

It is essential for this procedure that the acid catalyst utilized be oil soluble so that it may be incorporated in the resin solvent solution. This permits thorough mixing of the catalyst which is essential in order to ensure that the polymerization reaction occurs uniformly throughout the entire mass of treating chemical placed in the formation. The catalyst for use in our invention must also exhibit temperature sensitivity such that the catalytic polymerization does not occur during the time that the fluid is prepared and mixed on the surface of the earth and pumped into the formation. It is equally important that once the fluid is placed in the formation and left in a quiescent state for a period of time sufficient to ensure temperature equalization with the formation, that the polymerization reaction occur rapidly in order to permit completion of the procedure in a relatively brief period of time, so injection of the oil recovery fluid into the well can begin as soon as possible. Because of this dual requirement, the catalyst choice and concentration are both critical to the proper function of our invention.

As stated above, the preferred catalyst for use in our process is one which is oil soluble and very slightly water soluble. While we have previously disclosed that the preferred organic acid catalyst is orthonitrobenzoic acid for processes being applied to relatively high temperature (e.g., greater than 350° F.) formations, we have found that at temperatures less than 350° F. and especially when the formation temperature is below 280° F., orthonitrobenzoic acid is so weak and so insoluble that the time required for polymerization to proceed at least sufficiently far that no displacement of polymer from the sand grain occurs, is in the range of several days to a week or more. This long set time causes several problems. The polymerizable compound, e.g. the furfuryl alcohol, may be washed off the sand grains before polymerization proceeds far enough to render the polymer immobile, which greatly weakens the strength of the polymerized sand coating which causes the desired permeability reduction in the treated zone. Also, the total cost of a well treatment is greatly increased by the extended period which the well is shut in, before injection of oil recovery fluid can be resumed.

We have found that the desired set time of from 0.75 to 4.0 hours and preferably from 1-2 hours can be realized for any particular formation temperature in the range of 40° F. to 300° F. and especially from 60° to 280° F. if the pK of the acid catalyst and the concentration of the acid catalyst are carefully selected.

Once the acid has been selected, the acid concentration should be determined. The concentration of acid to yield the desired 0.75–4.0 hour set time is solely determined by the formation temperature. It is essential in applying our process to a formation that the temperature of the formation be known or measured. The following Table II gives the relationship between toluenesulfonic acid catalyst concentration and temperature to produce set time within the preferred 1-2 hour range.

TABLE II

| FORMATION TEMPERATURE °F. | % TOLUENE-SULFONIC ACID |
|---|---|
| Up to 80° F. | 5.0–3.8 |
| 80–120° F. | 3.8–3.1 |
| 120–140° F. | 3.1–2.4 |
| 140–200° F. | 2.4–1.4 |
| 200–230° F. | 1.4–0.8 |
| 230–260° F. | 0.8–0.5 |
| 260–300° F. | 0.50 |

Surprisingly, we have found that the above correlation holds for any mixture ratio of resin and the ester, e.g. butyl acetate, over the volume ratio 20 to 80 to 80 to 20.

One preferred method for forming a particularly effective fluid for use in practicing the embodiment of our invention involves mixing an approximately 50-50 mixture of the resin in its commercial form, which is an emulsion, with butyl acetate, after which the toluenesulfonic acid catalyst is dissolved in this mixture of resin and ester.

Since the melting point of toluenesulfonic acid is 223° F. it is sometimes necessary to incorporate the acid in a suitable diluent, usually a low carbon alcohol such as methanol, to facilitate mixing it with the resin emulsion. From 2 to 5 percent methanol is usually adequate for this purpose.

The quantity of the preflush used in the first step and the quality of the sand consolidating liquid comprising the resin, diluent and catalyst used to form the aerosol which is injected into the formation in the second step of our process varies depending on the thickness and porosity of the formation to which the permeability modification process is to be applied, as well as the diameter of the well and the desired thickness of the permeable barrier in the formation. The thickness and porosity of the formation and the diameter of the well will always be known, and it is ordinarily satisfactory if depth of the penetration is in the range of from $\frac{1}{4}$ to $\frac{1}{2}$ foot from the well bore. A volume of treating fluid equivalent to about 20% of the pore volume being treated is required. As an example, if it is desired to treat a formation whose thickness is 18 feet and porosity is 35% adjust the permeability in the portion of the formation from just outside the perforations of the wellbore which extends into the formation for a distance of $\frac{1}{2}$ foot, and the well being treated is 10 inches in diameter, then the volume of preflush and treating liquid necessary is calculated according to the example below.

Radius of hole:

$$\frac{10''}{2} = 5'' = \frac{5}{12 \text{ ft}} = .417 \text{ ft}$$

Radius of treated zone = 0.5 + 0.417 = 0.917 ft.

$$\pi[(.917)^2 - (.417)^2] \times 18 \times .35 \times .20 =$$

2.64 cubic feet = 19.75 gallons 42 cubic feet = 11.4 gallons of the preflush and of the treating liquid comprising resin, catalyst and ester.

In applying our methods, the treating liquid described above is mixed with gas on the surface to form the aerosol treating fluid mixture which passes through an injection string and into the formation where permeability modification is desired. The fluid is mixed with gas in a volume ratio in the range of one part liquid to from 0.2 to 1 and preferably 0.4 to 0.6 parts by volume gas.

The mixture of treating fluid and gas forms a two-phase mixture, ideally an aerosol, and enters the formation in that form. The droplets of treating liquid coalesce on the formation mineral surfaces, forming a liquid coating on the said surfaces. Since the dispersed drops of liquid in the aerosol treating fluid include the polymerizable oligomer and the acid, the liquid film formed on the mineral surfaces also comprises both oligomer and acid catalyst. As the film forms, the polymerization of oligomer begins due to contact with acid and proceeds very rapidly. The carrier gas portion of the aerosol maintains the void spaces between oligomer-coated sand grains, which insures that the treating zone will have sufficient permeability to allow oil recovery fluid and oil to flow through the treated zone after the coating has cured and oil production has been resumed.

Ordinarily, this aerosol treating fluid is injected relatively fast when using a 1 to 3 inch diameter line in the wellbore carrying treating fluid and gas. Under these conditions the transit time in the injection string will be from 10 to 60 seconds.

III. LIQUID TREATING FLUID EMBODIMENT

Finally, there is a third preferred embodiment of our process, which is particularly applicable to multi-well procedures in which an injection fluid is injected into one or more wells to displace petroleum through the formation to one or more remotely located production wells. This embodiment is used preferably in connection with the injection of a substantially all liquid phase displacement fluid for stimulating petroleum production such as water, or water-containing one or more surface active agents to reduce the surface tension between the injected fluid and the displaced fluid, or a polymer to increase the viscosity of the injected fluid in order to improve the mobility ratio between the injected fluid and displaced fluid, or a combination of several of these fluids. All of these displacement procedures share the common requirement that an injected fluid pass somewhat evenly and uniformly through the formation to displace petroleum toward a remotely located well, and adverse permeability distribution will reduce the effectiveness of any of these oil recovery processes. Accordingly, in this embodiment of our invention a procedure is applied to a formation prior to the injection of water or chemicalized fluids for oil recovery in order to alleviate injectivity distribution problems caused by poor permeability uniformity in a formation.

The resin which we have found to be especially preferable for use in this embodiment of our permeability modification process is a furfuryl alcohol oligomer. Any resin which will polymerize upon exposure to heat and contact with an acid catalyst can be used in this process; however, furfuryl alcohol oligomer $(C_4H_3O\text{-}CHO)_n$ is the particularly preferred polymerizable resin. This resin has the advantage of being relatively inexpensive and having the characteristic of autopolymerizing on exposure to acid catalyst, forming a thermal-setting resin which cures to an insoluble mass that is highly resistant to chemical attack as well as to thermal degradation. The particularly preferred commercial form in which this resin is available is Quacorr 1300 ® marketed by QO Chemicals. This resin is ordinarily obtained commercially in a form containing 90 to 95 percent furfuryl alcohol oligomer.

The furfuryl alcohol oligomer emulsion utilized in our process is so viscous that it must be diluted with an appropriate solvent in order to permit it to be pumped into the formation, and to accomplish relatively complete coating of sand grains or formation surfaces in the high permeability zones of the formation. Any solvent for the furfuryl alcohol oligomer would accomplish this objective. It is possible, however, to accomplish this and another more important objective by using as the diluent a hydrolyzable ester. The polymerization of the furfuryl alcohol oligomer produces water and the water produced by polymerization suppresses the polymerization reaction. If water produced during polymerization of furfuryl alcohol oligomer can be removed, it is possible to force the polymerization reaction to proceed further toward completion and thereby produce longer polymer chains than would result if water were left in the polymer reaction mass. A hydrolyzable ester will remove water as it is produced, leading to the formation of longer chain polymers which result in a stronger, more durable polymer matrix which coats formation sand grains or matrix surfaces to reduce the permeability of high permeability zones in the formation. Accordingly, our preferred diluent for the furfuryl alcohol oligomer is a hydrolyzable ester such as ethyl or butyl acetate, and our especially preferred species is butyl acetate.

It is essential for this procedure that the acid catalyst utilized be oil soluble so that it may be incorporated in the resin solvent solution. This permits thorough mixing of the catalyst which is essential in or order to ensure that the polymerization reaction occurs uniformly throughout the entire mass of treating chemical placed in the formation. Prior art methods which utilize a catalyst injected in a non-miscible fluid either before or after injection of the fluid containing the polymerizable resin, or present in a non-miscible phase of the polymer fluid, do not accomplish uniform reactions such as are possible by use of the present soluble catalyst. The catalyst for use in our invention must also be one which exhibits temperature sensitivity such that the catalytic polymerization does not occur during the time that the fluid is prepared and mixed on the surface of the earth or pumped into the formation. It is equally important that once the fluid is placed in the formation and left in a quiescent state for a period of time sufficient to ensure temperature equalization with the formation, that the polymerization reaction occur rapidly in order to permit completion of the procedure in an relatively brief period of time, so fluid injection can be initiated as soon as possible. Because of this dual requirement, both the catalyst choice and concentration are very critical to the proper function of our invention.

While orthonitrobenzoic acid is useful for processes being applied to relatively high temperature (e.g., greater than 350° F.) formations, we have found that at temperatures less than 350° F. and especially when the formation temperature is below 300° F., orthonitrobenzoic acid is so weak and so insoluble that the time required for polymerization to proceed at least sufficiently far that no displacement of polymer from the formation surface occurs, is in the range of several days to a week or more. This long set time causes several problems. The polymerizable compound, e.g. the furfuryl alcohol, may be washed off the formation surface before polymerization proceeds far enough to render the polymer immobile, which greatly weakens the quality of the formation permeability treatment. Also, the total cost of a well treatment is greatly increased by the extended period which the well is shut in, which delays initiating fluid injection.

We have found that the desired set time of from 0.75 to 4.0 and preferably from 1-2 hours can be realized for any particular formation temperature in the range of 60° F. to 350° F. and especially from 100° to 350° F. if the pK of the acid catalyst and the concentration of the acid catalyst are carefully selected.

The pK of an organic acid is defined as the negative of the ionization constant of the acid and is essentially an inverse scale measure of the strength of the acid, e.g. strong acids have lower pK values. The acid catalyst for this process must be an organic acid which is oil soluble and which has a pK in the range of 0.5 to 2.0 and preferably from 0.7 to 1.3. The especially preferred acid for this embodiment of our process is toluenesulfonic acid, usually paratoluenesulfonic acid, although mixed isomers may also be used. The following organic acids may also be used: chloroacetic acid, dichloroacetic acid, trichloroacetic acid and arylsulfonates. Mixtures of toluenesulfonic acid with the above may be used. For convenience, a mixture comprising 95% toluenesulfonic acid with 5% xylenesulfonic acid has been used in the field because the mixture is liquid at field conditions and therefore easier to mix with the other fluids in preparing the treating fluid. This is a commercial product available under the trade name WITCAT TX ACID ®. Other mixtures may also be used, to ensure that the melting point is below ambient temperature.

Once the acid has been selected, the acid concentration should be determined. The concentration of acid to yield the desired 0.75-4.0 hour set time is solely determined by the formation temperature. It is essential in applying our process to a formation that the temperature of the formation be known or measured. The following table gives the relationship between toluenesulfonic acid catalyst and temperature to produce set time within the preferred 1-2 hour range.

TABLE III

| FORMATION TEMPERATURE °F. | % TOLUENE-SULFONIC ACID |
|---|---|
| Up to 80° F. | 5.0–3.8 |
| 80–120° F. | 3.8–3.1 |
| 120–140° F. | 3.1–2.4 |
| 140–200° F. | 2.4–1.4 |
| 200–230° F. | 1.4–0.8 |
| 230–260° F. | 0.8–0.5 |
| 260–300° F. | 0.50–0.3 |

Surprisingly, we have found that the above correlation holds for any mixture ratio of resin in the ester, e.g. butyl acetate, over the volume ratio 90 to 10 to 40 to 60.

One preferred method for forming a particularly effective fluid for use in practicing the process of our invention involves mixing an approximately 50-50 mixture of the resin in its commercial form, which is usually an emulsion, with butyl acetate, after which the toluenesulfonic acid catalyst is dissolved in this mixture of resin and ester.

Since the melting point of toluenesulfonic acid is 223° F., it is sometimes necessary to incorporate the acid in a suitable diluent, usually a low carbon alcohol such as methanol, to facilitate mixing it with the resin emulsion. From 2 to 5 percent methanol is usually adequate for this purpose.

The quantity of the fluid comprising the resin, diluent and catalyst injected into the formation varies depending on the thickness and porosity of the formation to which the sand consolidation process is to be applied, as well as the diameter of the well and the desired thickness of the permeable barrier in the formation as is described in the last embodiment described above.

The polymerizable resin used to prepare the treating fluid is normally available commercially as a mixture containing about 5 percent water. The strength of the coating formed on the mineral surfaces in the treated zones of the formation will be increased if at least a portion of this water is removed before the resin polymerizes. We have found that the desired strength is best accomplished by injecting brine or water containing an inorganic salt, preferably sodium chloride, into the string to displace the residual amount of resin fluid from the injection string, and also to pass through the portion of the of the formation occupied by the resin fluid. Injection of the brine develops permeability within the treated portion of the formation which ensures that after the resin has polymerized, the resultant zone will be sufficiently permeable to the flow of fluids to allow passage of injected fluid through the zone. The salinity of water utilized in this procedure is quite important. The surface of the resin coated sand grains should be de-watered in order to aid in the polymerization reaction and also in order to produce a denser stronger matrix coating the formation mineral surface. Fresh water or water containing up to 70 percent salt does not accomplish the drying action necessary to produce the desired strength in the polymerized coating. The desired results will only be achieved if the second fluid injected into the formation is at least 70% saturated with respect to the inorganic salt and preferably 80% saturated. Our particular preferred embodiment uses essentially saturated brine, specifically water saturated with sodium chloride at the conditions of injection. By using at least 70% saturated brine, the desired development of permeability is achieved without displacing any of the resin from the mineral surfaces and dehydration of the resin necessary for the polymerization reaction to occur in the time and to the extent desired for optimum polymerization is also realized.

As a practical matter, the brine utilized will probably be water containing mainly sodium chloride because of the cost and availability of sodium chloride in the field. This is a particularly preferred brine for our purpose. We have discovered that potassium chloride does not work well in this application, and so the fluid injected into the formation after the polymerization fluid has been injected should not contain appreciable quantities of potassium chloride. The quantity of brine injected into the formation should be sufficient to displace all of the residual resin fluid from the injection string, and also sufficient to pass through the resin treated portion of the formation. It is generally sufficient if about the same volume of brine as the polymerization fluid is utilized, and the rate at which it is injected is not particularly critical for our purposes.

After the above steps of injecting the polymerization fluid and the sodium chloride solution or brine are completed, the well should be shut in and left to stand for a period of from 1 to 4 and preferably from 1 to 2 hours. The time required for the polymerization reaction to proceed to completion is predetermined by the procedure discussed above and should be in the range of 1-2 hours.

In application of either the sand consolidation or water shut off embodiment of our invention, leaving the well shut in for more than 2 hours will have no adverse effect on the process, and indeed the strength of the polymerized resin may increase in this additional period. The set time as described herein only defines the time in which the resin will proceed to a minimum level to prevent removing the polymer from the formation mineral surfaces.

FIELD EXPERIMENT

An opportunity arose to test our process in a field being subjected to steam stimulation. In this particular case, a plurality of wells were completed in a relatively shallow formation which is about 50 feet thick and contains viscous petroleum. Each well is used as both an injection well and a production well. A sand consolidation process has been developed for treating these wells which was applied at the end of the steam injection phase, and before production of petroleum began, in order to reduce the production of the sand from the formation into the well in the subsequent oil production cycle. The treatment, of course, had no effect on the steam injection distribution, since it was applied at the end of the steam phase and before production began, which was when the concern for sand control effectiveness arises. Treatment of the well at the beginning of the steam injection phase would not effectively reduce sand production after the completion of the steam injection phase and production began, because the continued injection of steam over a period of 1 to 2 weeks as was the practice in this particular field would eventually destroy the polymerized coating before production ever began, so sand control would not be accomplished.

A steam injection profile was run on the interval being stimulated. In one particular case, it was found that in a fifty foot interval of formation, approximately 95% of the total amount of steam being injected into the formation was entering the top 25 feet or 50 percent of the thickness of the formation, while the bottom 50 percent or 25 feet of the formation was receiving only five percent of the steam. This meant that the bottom of the petroleum containing interval was receiving very little steam and therefore would not respond to the steam stimulation production and little oil recovery would be obtained from that bottom portion of the interval.

It was decided to apply the process of our invention by forming an aerosol comprising dispersed liquid drops of furfuryl alcohol monomer in steam and injecting this aerosol treating fluid into the formation for the purpose of improving the steam injectivity profile.

A preflush of 50 liters of ethyl acetate was injected into the steam. Next, 100 liters of treatment fluid comprised of 40 liters furfuryl alcohol, 30 liters of ethyl acetate, 30 liters of methyl alcohol, and ½ liter of sulfuric acid was mixed and then injected into the steam, at a rate of 21 liters per minute. The chemical injection unit was then disconnected and the steam injection was continued for one week.

After the above described treatment, the injection profile of the interval was again measured and it indicated that 45 percent of the steam was now entering the upper fifty percent or twenty-five feet of the interval, whereas 55 percent of the steam was entering the lower fifty percent or 25 feet of the interval. This represents a dramatic improvement, since the portion which was originally receiving almost none of the steam, was now receiving more than half of the steam. As a result of this treatment, substantially more of the oil containing formation was contacted by steam, and so significantly improved oil recovery from the zone previously unstimulated by steam was achieved. It is especially noteworthy that this very significant improvement was achieved in only one treatment, and that the amount of resin used was only about ½ gallon per foot of formation treated.

While our process has been described above in terms of a number of illustrative embodiments, including what we believe to be the best embodiment known to us at the present time, it is clearly not so limited since many variations thereof will be apparent to persons skilled in the art. It is our intention that our invention be limited only by the limitations contained in the claims appended immediately hereinafter below.

We claim:

1. A method for treating a subterranean petroleum-containing formation penetrated by at least one well in fluid communication with the formation, said formation comprising at least two layered intervals having differing permeabilities to fluid injection, including a first interval of relatively high permeability and a second interval of relatively lower permeability, in order to improve the injectivity profile of the formation to subsequently-injected oil recovery fluid, comprising:

(a) providing an aerosol treating fluid comprising steam, a polymerizable compound comprising a monomer or oligomer or furfuryl alcohol, a diluent for the compound, and an acid catalyst capable of causing polymerization of the polymerizable compound at formation temperatures, said acid being selected from the group consisting of sulfuric acid, toluene sulfonic acid, phosphoric acid, trichloroacetic acid, nitric acid and mixtures thereof;

(b) injecting said treating fluid into the formation to pass into the more permeable interval of the petroleum formation and to deposit on the mineral surfaces of the formations; and (c) allowing the injected treating fluid to remain in the formation for a period of time sufficient to accomplish at least partial polymerization of the polymerizable compound, thereby reducing the permeability of the more permeable layer of the formation, so an increased portion of the subsequently injected oil recovery fluid enters the second interval.

2. A method as recited in claim 1 wherein the polymerizable compound is a monomer of furfuryl alcohol.

3. A method as recited in claim 1 wherein the polymerizable compound is an oligomer of furfuryl alcohol.

4. A method as recited in claim 1 wherein the diluent is a low molecular weight alcohol.

5. A method as recited in claim 4 wherein the diluent is methanol.

6. A method as recited in claim 1 wherein the diluent is an ester.

7. A method as recited in claim 6 wherein the ester is ethyl acetate.

8. A method as recited in claim 1 wherein the volume of treating fluid injected into the formation is sufficient to coat the mineral surfaces in the more permeable interval for a distance of from ½ to 1 foot from the wellbore.

9. A method as recited in claim 1 wherein the polymerizable compound is a monomer of furfuryl alcohol.

10. A method as recited in claim 9 wherein the concentration of the furfuryl alcohol monomer is from 10 to 50 percent by volume based on the total volume of the treating fluid.

11. A method as recited in claim 9 wherein the concentration of the furfuryl alcohol monomer is from 20 to 30 percent by volume based on the total volume of the treating fluid.

12. A method as recited in claim 1 wherein the diluent is a low molecular weight alcohol.

13. A method as recited in claim 12 wherein the diluent is methanol.

14. A method as recited in claim 12 wherein the concentration of alcohol in the treating fluid is from 90 to 50 percent by volume.

15. A method as recited in claim 12 wherein the concentration of alcohol in the treating fluid is from 90 to 70 percent by volume.

16. A method as recited in claim 1 wherein the catalyst is sulfuric acid.

17. A method as recited in claim 1 wherein the concentration of acid catalyst in the treating fluid is from 0.1 to 1.0 normal.

18. A method as recited in claim 1 wherein the concentration of acid catalyst in the treating fluid is from 0.25 to 0.5 normal.

19. A method as recited in claim 1 wherein the volume ratio of treating fluid to steam is from 0.2 to 1.

20. A method as recited in claim 1 wherein the acid content of the treating fluid is adjusted to cause polymerization to occur after a time slightly greater than the time required for the steam and treating fluid to be injected into the formation.

21. A method as recited in claim 1 wherein the fluids are left in the formation for a period of at least 6 hours.

22. A method as recited in claim 1 wherein the treating fluid also contains an ester.

23. A method as recited in claim 22 wherein the ester is butyl acetate.

24. A method as recited in claim 22 wherein the concentration of ester is from 20 to 30 volume percent.

25. A method as recited in claim 22 wherein the steam quality is below 80 percent and the ester concentration is from 20 to 30 percent.

* * * * *

UNITED STATES PATENT AND TRADEMARK OFFICE
CERTIFICATE OF CORRECTION

PATENT NO. : 5,199,490

DATED : April 6, 1993

INVENTOR(S) : Billy Wayne Surles, Philip Daniel Fader, and Carlos Walter Pardo

It is certified that error appears in the above-identified patent and that said Letters Patent is hereby corrected as shown below:

Column 18, line 19:

In Claim 15, line 19, please substitute --80-- for "90".

Signed and Sealed this

Seventh Day of December, 1993

Attest:

BRUCE LEHMAN

Attesting Officer     Commissioner of Patents and Trademarks